US012717704B2

(12) United States Patent
Joseph

(10) Patent No.: US 12,717,704 B2
(45) Date of Patent: Aug. 25, 2026

(54) APPLICATION SUBSCRIPTION AUTOMATION AND TEST MANAGEMENT TRACEABILITY

(71) Applicant: SAP SE, Walldorf (DE)

(72) Inventor: David Leo Joseph, Bangalore (IN)

(73) Assignee: SAP SE, Walldorf (DE)

( * ) Notice: Subject to any disclaimer, the term of this patent is extended or adjusted under 35 U.S.C. 154(b) by 281 days.

(21) Appl. No.: 18/492,981

(22) Filed: Oct. 24, 2023

(65) Prior Publication Data

US 2025/0130929 A1 Apr. 24, 2025

(51) Int. Cl.
*G06F 11/3668* (2025.01)
*G06F 11/07* (2006.01)
*G06F 11/3698* (2025.01)

(52) U.S. Cl.
CPC ...... *G06F 11/3688* (2013.01); *G06F 11/0709* (2013.01); *G06F 11/3698* (2025.01)

(58) Field of Classification Search
None
See application file for complete search history.

(56) References Cited

U.S. PATENT DOCUMENTS 11,212,197 B1 * 12/2021 Downey ............... H04L 63/102
2014/0282407 A1 * 9/2014 Channamsetti ..... G06F 11/3688 717/124
2019/0361762 A1 * 11/2019 Johnson .............. G06F 11/0751
2020/0162318 A1 * 5/2020 Patil ........................ H04L 67/10
2022/0138014 A1 * 5/2022 Maturi ................ G06F 9/44505 709/226
2023/0116441 A1 * 4/2023 Majd .................. G06F 11/3612 717/131
2023/0153169 A1 * 5/2023 Maturi .................. G06F 9/5072 709/217
2023/0176885 A1 * 6/2023 Sailer .................... H04L 63/108 718/1

(Continued)

OTHER PUBLICATIONS

Eboseremen et al., "Secure Data Integration in Multi-Tenant Cloud Environments: Architecture for Financial Services Providers," ResearchGate, 2022. (Year: 2022).*

(Continued)

*Primary Examiner* — Ryan D. Coyer
(74) *Attorney, Agent, or Firm* — Mintz Levin Cohn Ferris Glovsky and Popeo, P.C.

(57) ABSTRACT

Techniques for automating a software application subscription process are presented herein. In an example, in response to receiving a subscription request from a client device, a subscription automator extracts a plurality of parameters from the subscription request. Also, the subscription automator retrieves a given script template from an automation framework, where the given script template corresponds to a given cloud service application to which one or more users wish to subscribe. The subscription automator generates an executable script by populating the first script template with the plurality of parameters. Next, the subscription automator causes the first executable script to be executed to initiate a subscription process of the given cloud service application. Then, the subscription automator creates subscriptions to the given cloud service application for the one or more users as a result of initiating the subscription process.

16 Claims, 8 Drawing Sheets

(56) References Cited

U.S. PATENT DOCUMENTS

| | | | | |
|---|---|---|---|---|
| 2023/0229793 | A1* | 7/2023 | Ramsey | G06F 21/604<br>726/26 |
| 2023/0231904 | A1* | 7/2023 | Nolfo | H04L 67/1008<br>709/224 |
| 2023/0418634 | A1* | 12/2023 | Madishetti | G06F 9/5072 |
| 2024/0211148 | A1* | 6/2024 | Zhang | G06F 3/0629 |
| 2025/0053439 | A1* | 2/2025 | Asvaraksh | G06F 9/542 |
| 2025/0055881 | A1* | 2/2025 | Kedia | H04L 63/20 |
| 2025/0117315 | A1* | 4/2025 | Thomas | G06F 11/3698 |

OTHER PUBLICATIONS

Kansara et al., “Cloud Migration Strategies and Challenges in Highly Regulated and Data-Intensive Industries: A Technical Perspective,” ResearchGate, 2021. (Year: 2021).*

Maksuti et al., “Automated and Secure Onboarding for System of Systems,” IEEE, 2021. (Year: 2021).*

* cited by examiner

APPLICATION SUBSCRIPTION AUTOMATION AND TEST MANAGEMENT TRACEABILITY

TECHNICAL FIELD

The present disclosure generally relates to cloud computing.

BACKGROUND

In a cloud computing environment, multiple tenants can be served by a shared pool of computing resources including, for example, computer networks, servers, storage, applications, services, and/or the like. A tenant can be any entity that requires a secure and exclusive computing environment implemented using the shared pool of computing resources. As such, the multi-tenant cloud computing environment may isolate identity and access management across different tenants as well as segregate tenant-specific data and resources.

SUMMARY

In some implementations, various techniques for automating a software application subscription process are employed. In an example, in response to receiving a subscription request from a client device, a subscription automator extracts a plurality of parameters from the subscription request. Also, the subscription automator retrieves a given script template from an automation framework, where the given script template corresponds to a given cloud service application to which one or more users wish to subscribe. The subscription automator generates an executable script by populating the first script template with the plurality of parameters. Next, the subscription automator causes the first executable script to be executed to initiate a subscription process of the given cloud service application. Then, the subscription automator creates subscriptions to the given cloud service application for the one or more users as a result of initiating the subscription process.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

For a multi-tenant cloud application operating on a cloud system, new versions are released on a frequent basis. For each new release, customers connecting to the cloud system will need to obtain new subscriptions to the release. Typically, obtaining new subscriptions is a manual process that is performed in a serial fashion user by user. This can be a cumbersome process when hundreds or even thousands of users need to be onboarded to the new release of the application.

Accordingly, solutions to the above problem are presented herein. Rather than performing the onboarding process in a manual, serial manner, the onboarding process is automated and performed in seconds rather than in the hours typically allotted to the process. An automation server automatically generates a script from a script template and from a user list. The automatically generated script is executed by a command line interface to obtain subscriptions for the users in their designated roles. The results of the onboarding process are provided to a test management engine for further analysis and for traceability purposes. As used herein, the term “onboarding process” is defined as a process or procedure for automating subscriptions to a given cloud service application for some number of users in their desired roles. It is noted that the term “onboarding process” may also be referred to as a “subscription process”.

Figure 1:
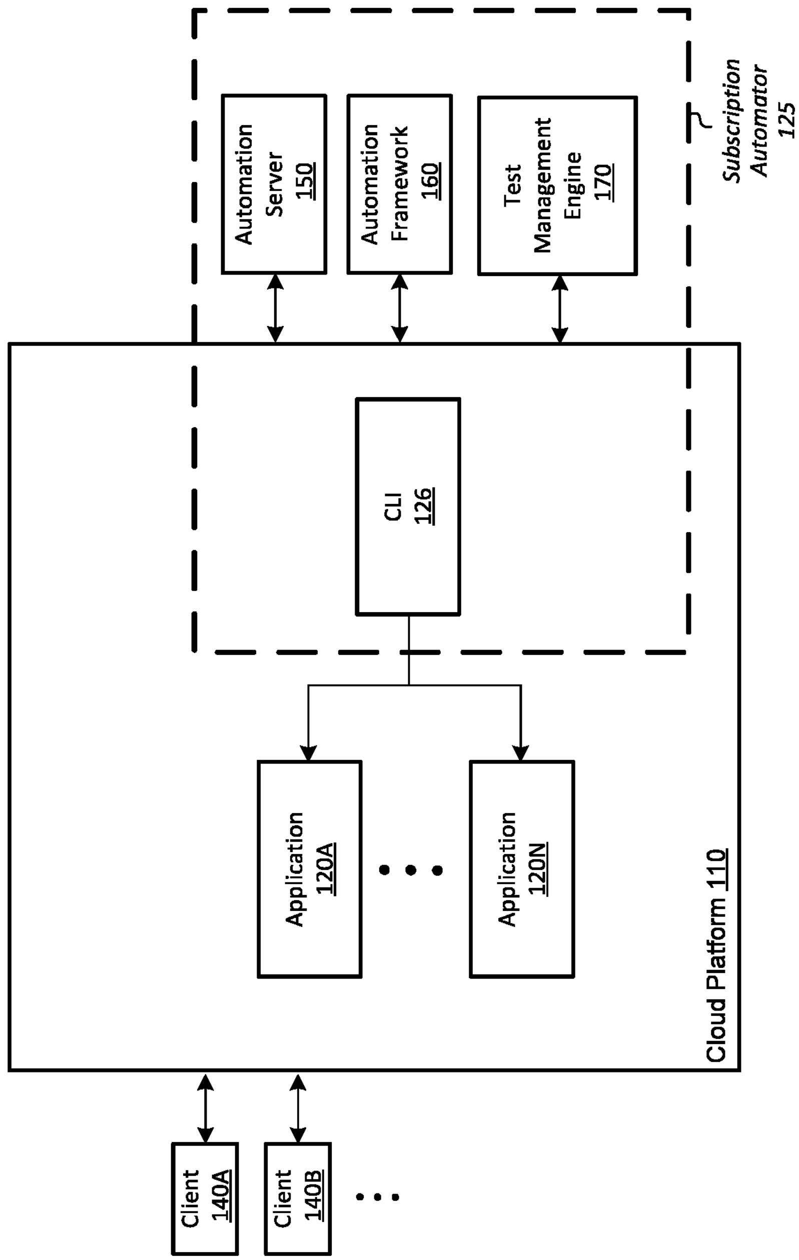
FIG. 1 illustrates an example of a cloud platform, in accordance with some example implementations of the current subject matter.

FIG. 1 depicts a diagram illustrating an example of a system 100 consistent with implementations of the current subject matter. Referring to FIG. 1, the system 100 may include a cloud platform 110. The cloud platform 110 may provide resources that can be shared among a plurality of tenants. For example, the cloud platform 110 may be configured to provide a variety of services including, for example, software-as-a-service (SaaS), platform-as-a-service (PaaS), infrastructure as a service (IaaS), and/or the like, and these services can be accessed by one or more tenants of the cloud platform 110. In the example of FIG. 1, the system 100 includes a first tenant 140A (labeled client) and a second tenant 140B (labeled client as well), although system 100 may include any number of other tenants. For example, multitenancy enables multiple end-user devices (e.g., a computer including an application) to access a given cloud service having shared resources via the Internet and/or other type of network or communication link(s).

The cloud platform 110 may include resources, such as at least one computer (e.g., a server), data storage, and a network (including network equipment) that couples the computer(s) and storage. The cloud platform 110 may also include other resources, such as operating systems, hypervisors, and/or other resources, to virtualize physical resources (e.g., via virtual machines) and provide deployment (e.g., via containers) of applications (which provide services, for example, on the cloud platform, and other resources). In the case of a "public" cloud platform, the services may be provided on-demand to a client, or tenant, via the Internet. For example, the resources at the public cloud platform may be operated and/or owned by a cloud service provider (e.g., Amazon Web Services, Azure), such that the physical resources at the cloud service provider can be shared by a plurality of tenants. Alternatively, or additionally, the cloud platform 110 may be a "private" cloud platform, in which case the resources of the cloud platform 110 may be hosted on an entity's own private servers (e.g., dedicated corporate servers operated and/or owned by the entity). Alternatively, or additionally, the cloud platform 110 may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In various embodiments, the cloud platform 110 provides services to client 140A-B. Each service may be deployed via a container, which provides a package or bundle of software, libraries, configuration data to enable the cloud platform to deploy during runtime the service to, for example, one or more virtual machines that provide the service to client 140A. In some embodiments, the service is deployed during runtime and provided by a given application 120A-N. The service may also include logic (e.g., instructions that provide one or more steps of a process) and an interface. The interface may be implemented as an Open Data Protocol (OData) interface (e.g., HTTP message may be used to create a query to a resource identified via a URI), although the interface may be implemented with other types of protocols including those in accordance with REST (Representational state transfer).

In some embodiments, the cloud platform 110 serves, with the same application instance and common resources, one or more relatively small tenants (e.g., client 140B) as well as one or more relatively large tenants (e.g., client 140A). In other words, the cloud platform 110 serves a plurality of tenants with the tenants varying in size. One or more of the large tenants can have thousands of users who need access to a given application 120A. When a new release of the given application 120A is available, for example, the onboarding process for subscribing users to the new release may be a lengthy, manual process which requires adding users in their specified roles one-by-one. An improvement of this manual process is to leverage automation server 150 and automation framework 160 to automate the onboarding process.

In some embodiments, in order to initiate the automated onboarding process, the client, such as client 140A, may generate an onboarding request (i.e., subscription request) and send the onboarding request to the automation server 150. The onboarding request may also include a list of users and their respective roles for the given application 120A. The types of roles that may be specified may vary according to the application and/or embodiment, and may include roles such as administrator, user, user level 1, user level 2, user level 3, student, trainer, trainee, supervisor, assistant, and so on. Each application may have an associated set of roles that are defined for the application.

In response to receiving the onboarding request, automation server 150 retrieves a script template, corresponding to the given application 120A, from automation framework 160 and populates the script template with the list of users and their respective roles. The result of this step is the generation of an executable script, which is then conveyed by automation server 150 to command line interface (CLI) 126 for execution. The executable script is able to accommodate any number of users. As used herein, the term "script" is defined as a list of commands that are performed sequentially by a command interpreter (e.g., command line interface) whenever the script name is entered as a single command. The commands, which may also be referred to as instructions, may be interpreted prior to being executed. The commands included in the script may be written according to any suitable script language (e.g., Perl, JavaScript).

After the executable script is generated from the script template and user list, CLI 126 executes the executable script for the specified users to obtain their subscriptions to the given application 120A. After CLI 126 executes the script, the results of the onboarding process are conveyed to test management engine 170 for verification and traceability. What was once a cumbersome, manual process can now be performed in an efficient, automatic manner. As this process can be repeated for each new release of applications 120A-N, this achieves considerable efficiency gains over the prior onboarding techniques.

It is noted that while automation server 150, automation framework 160, and test management engine 170 are shown as being separate from cloud platform 110, this is shown merely for ease of illustration. In some embodiments, one or more of automation server 150, automation framework 160, and test management engine 170 are part of cloud platform 110, while in other embodiments, one or more of automation server 150, automation framework 160, and test management engine 170 are separate from cloud platform 110. Additionally, in one example, CLI 126, automation server 150, automation framework 160, and test management engine 170 may be part of subscription automator 125 which performs the techniques described herein. Subscription automator 125 may be implemented as a single component in one location in one example, while in other examples, subscription automator 125 may be partitioned into two or more components at two or more locations.

Figure 2:
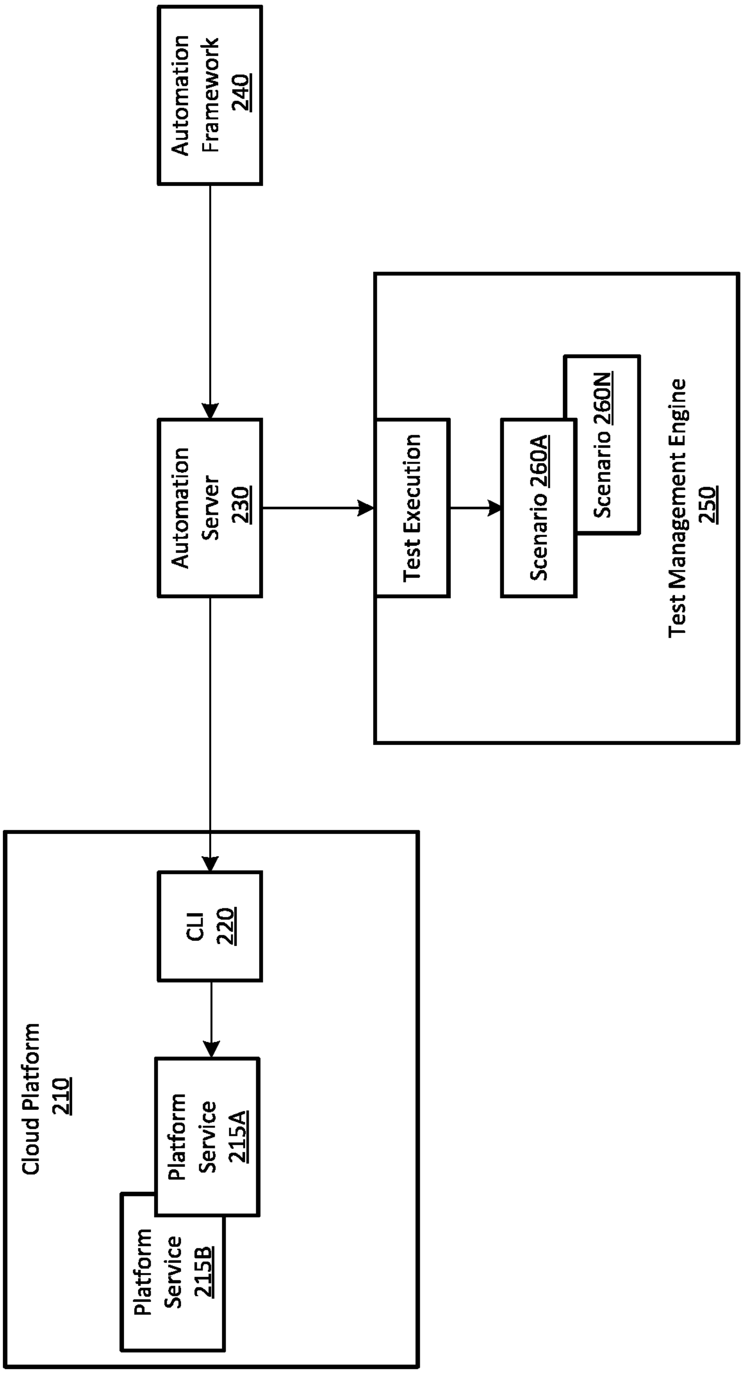
FIG. 2 illustrates an example of a system, in accordance with some example implementations of the current subject matter.

Turning now to FIG. 2, another system 200 is depicted for implementing the subscription automation techniques described herein. System 200 includes at least cloud platform 210, automation server 230, automation framework 240, and test management engine 250. Cloud platform 210 includes any number of platform services 215A-B which provide applications and other functionality for the clients (e.g., clients 140A-B of FIG. 1) connecting to cloud platform 210. It is noted that platform services 215A-B may also be referred to herein as applications 215A-B. Also, cloud platform 210 includes command line interface (CLI) 220 for executing single commands, scripts, and the like. In some embodiments, CLI 220 executes scripts which allow users to obtain subscriptions to the various platform services 215A-B. It is noted that CLI 220 may be referred to herein more generally as an "execution engine", "execution unit", "processing unit", or the like.

In some embodiments, automation server 230 initiates an onboarding process in response to receiving an onboarding request from a client. In some cases, the onboarding requests originate from the clients. In other cases, automation server 230 notifies one or more clients when a new release of a given platform service 215A becomes available or when a new release of a given platform service 215A will soon be available to clients. In cases where automation server 230 notifies a given client of a new release, this notification may initiate an automatic onboarding request generation process that results in an onboarding request being automatically generated for the given client. In some embodiments, the given client selects a subscription plan that includes a feature for automatically generating an onboarding request in response to a new release of a given platform service 215A. The user list may be pre-supplied by the given client in these embodiments. As used herein, the term "onboarding request" is defined as a request to subscribe one or more users to a given application. It is noted that the term "onboarding request" may also be referred to as a "subscription request".

In response to automation server 230 receiving an onboarding request corresponding to a given client, the automation server 230 accesses one or more script templates from automation framework 240. In some embodiments, automation framework 240 has a separate script template corresponding to each platform service 215A-B. In other embodiments, automation framework 240 has multiple script templates for each platform service 215A-B, with each script template corresponding to a different release or version of the respective platform service 215A-B. In some embodiments, the onboarding request from the given client (or the onboarding request automatically generated on behalf of the given client) includes an identification of the particular platform service 215A, a list of users, a list of each user's desired role in the identified platform service 215A, and a mail identifier (ID) for each user. In other embodiments, the onboarding request includes other information (e.g., usage limits, consumption mode) for each user. Depending on the embodiment, the user list could be in the form of a spreadsheet, a word processing document, or other type of file.

In some embodiments, automation server 230 generates an executable script from a selected script template by inserting the fields from the onboarding request user list into the appropriate locations of the selected script template. In some embodiments, each script template includes placeholders for receiving the various parameters from an onboarding request. After generating the executable script, automation server 230 causes the executable script to be executed by CLI 220. Execution of the executable script creates subscriptions to the selected platform service 215A for the respective users in their desired roles. It is noted that the term "executable script" may also be referred to herein as "executable commands", "executable file", "program instructions", "program file", "program commands", or the like.

After the executable script has been executed by CLI 220 to achieve the desired onboarding results, automation server 230 forwards the results of the onboarding process to test management engine 250. In some embodiments, the results of the onboard process are sent as an email, while in other embodiments, other ways of sending the results may be employed. It is noted that the onboarding process may also be referred to herein as the "test execution process" or the "subscription process". In some embodiments, the results of a particular onboarding process indicate whether each user was successfully authorized to access the application in the specified role. In cases of success, an email may be sent to each user given privileges to access the application, with the email including login credentials and a specification of the particular role to the respective user. If the result for a given user was a failure, then various corrective actions are taken by test management engine 250 and/or automation server 230. Depending on the embodiment, the corrective actions may include notifying the client, generating a message for an administrator, regenerating an updated executable script with one or more updated parameters, rerunning the updated executable script with the one or more updated parameters, and/or other actions.

In some embodiments, test management engine 250 stores a plurality of scenarios 260A-N corresponding to different onboarding processes that have been executed. Each scenario 260A-N may include a variety of information, such as the customer-provided list, the raw, unpopulated script template, the executable script, the results of the onboarding process (e.g., successful subscription for N users, unsuccessful subscription for M users), log messages, error messages, and so on.

Figure 3:
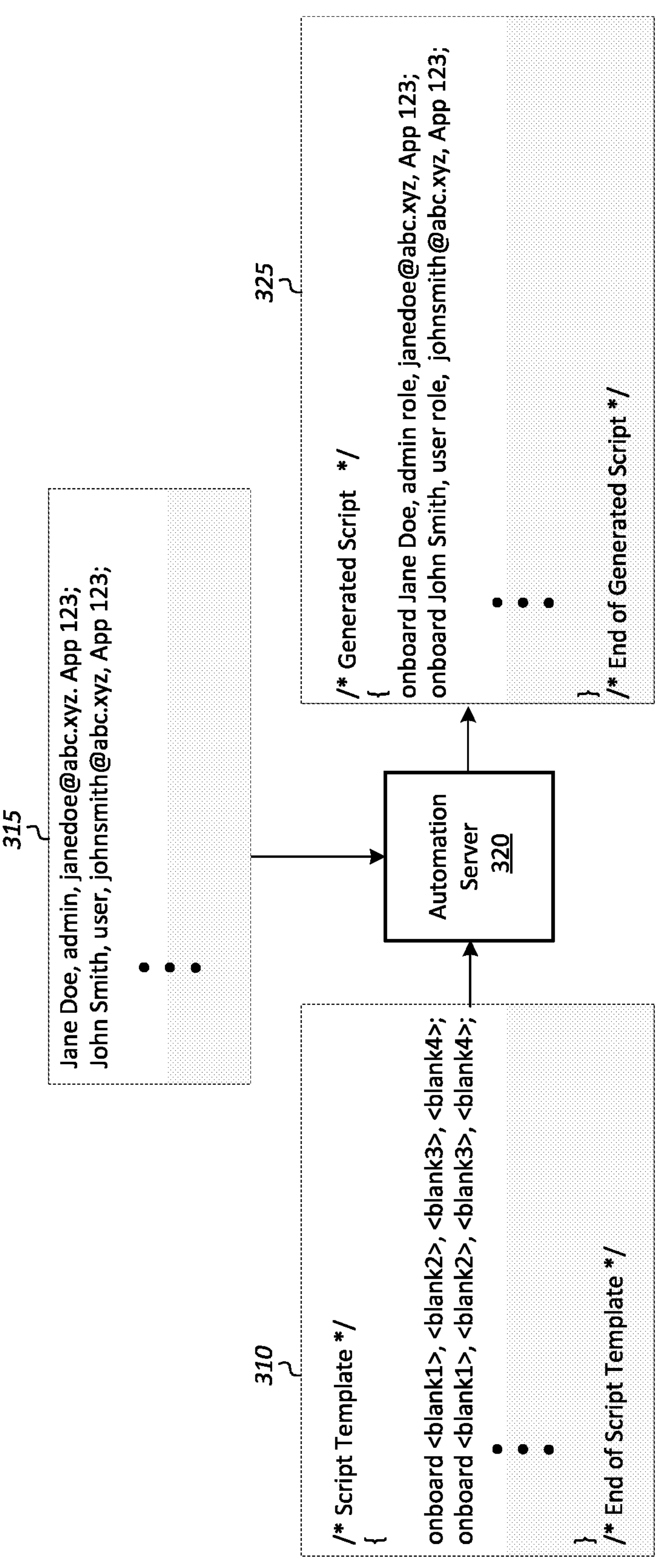
FIG. 3 illustrates an example of an automation server generating an executable script, in accordance with some example implementations of the current subject matter.

Referring now to FIG. 3, an example is depicted of an automation server generating an executable script in accordance with some embodiments. When a client wishes to subscribe some number of users to a given application, the client generates an onboarding request which is conveyed to automation server 320. The onboarding request may include a list 315, which lists the users who need privilege to access the given application, the role of each user, the mail ID of each user, an identification of the given application, and so on. The list 315 may include any number and type of parameters for each user, and these parameters may vary from embodiment to embodiment. For example, in some embodiments, the list 315 may include parameters such as usage limits, consumption modes, subscription plan types (e.g., premium, standard), and so on, in addition to the type of role for each user. As shown in FIG. 3, list 315 is provided to automation server 320. While list 315 includes only two users, it should be understood that this is shown merely for illustrative purposes. A customer-provided list may have any number of users, from hundreds to thousands or more, with the number varying depending on the size of the organization and depending on the specific onboarding request.

When automation server 320 is notified of the onboarding request, automation server 320 retrieves a script template 310 for the corresponding application. As shown in FIG. 3, script template 310 includes a number of placeholders (e.g., blank1, blank2, blank3, blank4) that will be replaced with actual customer data. Automation server 320 retrieves parameter fields from list 315 and populates the placeholders in script template 310 with the appropriate parameters so as to create generated script 325. For example, the first placeholder is replaced with the user name, the second placeholder is replaced with the role, the third placeholder is replaced with the mail ID, and the fourth placeholder is replaced with an identification of the application. When finished, automation server 320 will have created generated script 325, which is an executable script for satisfying the onboarding request of the client. It should be understood that the examples of script template 310 and generated script 325 are shown merely as illustrative examples. Other types of script templates and generated scripts, with other numbers and types of placeholders, including other types of data, and/or formatted in other suitable manners are possible and are contemplated. As used herein, the term "script template" is defined as a preliminary script that is targeted toward a specific application but does not yet contain the parameters needed for executing the script to subscribe one or more users to the specific application. These parameters may include user identifiers, a desired role for each user, a usage limit for each user, and so on.

Figure 4:
FIG. 4 illustrates an example of a process for performing an automated onboarding process, in accordance with some example implementations of the current subject matter.
Figure 4:
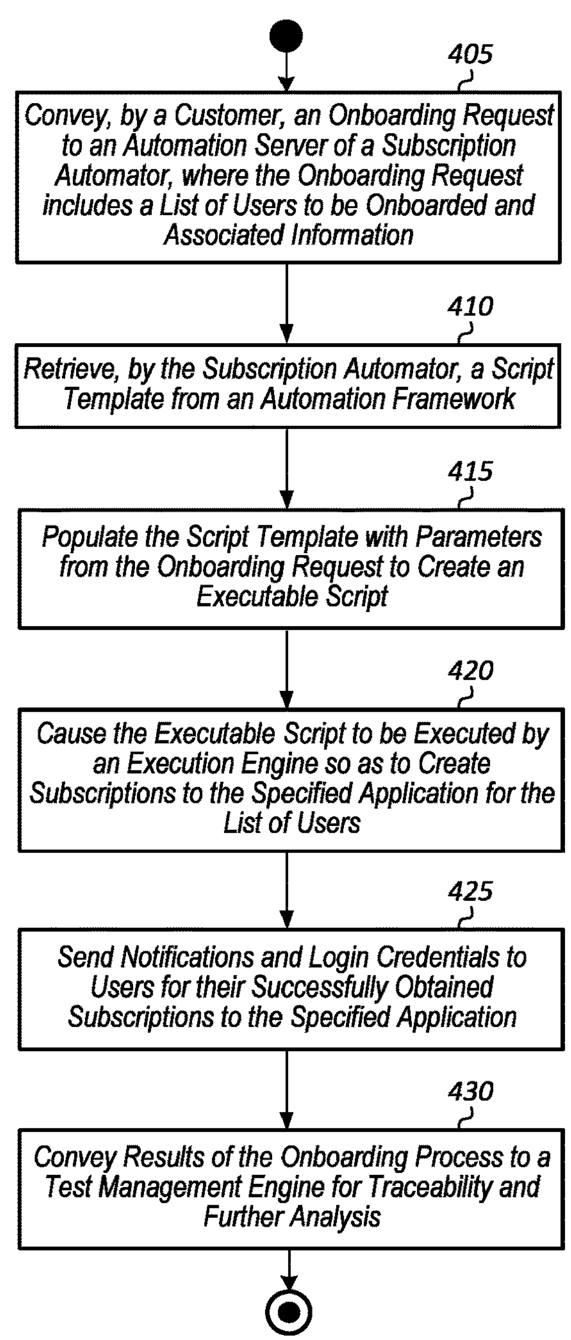

Turning now to FIG. 4, a flow diagram illustrating a process for performing an automated onboarding process is shown. A customer conveys an onboarding request to an automation server (e.g., automation server 150 of FIG. 1) of a subscription automator (e.g., subscription automator 125), where the onboarding request includes a list of users to be onboarded and associated information (block 405). In some embodiments, the associated information includes, for each user, a desired role, a consumption mode, a usage limit, a mail ID, and/or an identification of the application. In other embodiments, the associated information may include other data and/or parameters.

In response to receiving the onboarding request, the automation server of the subscription automator retrieves a script template from an automation framework (block 410). It is noted that the automation framework may include a library of script templates for different software applications, and the automation server may retrieve the script template from the library of script templates in block 410. Next, the automation server of the subscription automator populates the script template with parameters from the onboarding request to create an executable script (block 415). Then, the automation server of the subscription automator causes the executable script to be executed by an execution engine so as to create subscriptions to the specified application for the list of users (block 420). In some embodiments, the execution engine is a command line interface (e.g., CLI 126 of FIG. 1). As used herein, the term "subscription" is defined as authorizing and/or enabling a user to have access to and/or execute a given software application in accordance with a given service agreement. Generally speaking, software as a subscription is the practice of providing users time-limited access to software in exchange for either upfront or regular payments. A subscription typically includes software access as well as maintenance and support in accordance with a given license agreement.

Next, the automation server of the subscription automator sends notifications and login credentials to users for their successful subscriptions to the specified application (block 425). Also, the automation server of the subscription automator conveys results of the onboarding process to a test management engine for traceability and further analysis (block 430). More details on the automation server of the subscription automator conveying results of the onboarding process to the test management engine are provided below in the discussion associated with method 500 (of FIG. 5). After block 430, method 400 ends.

Figure 5:
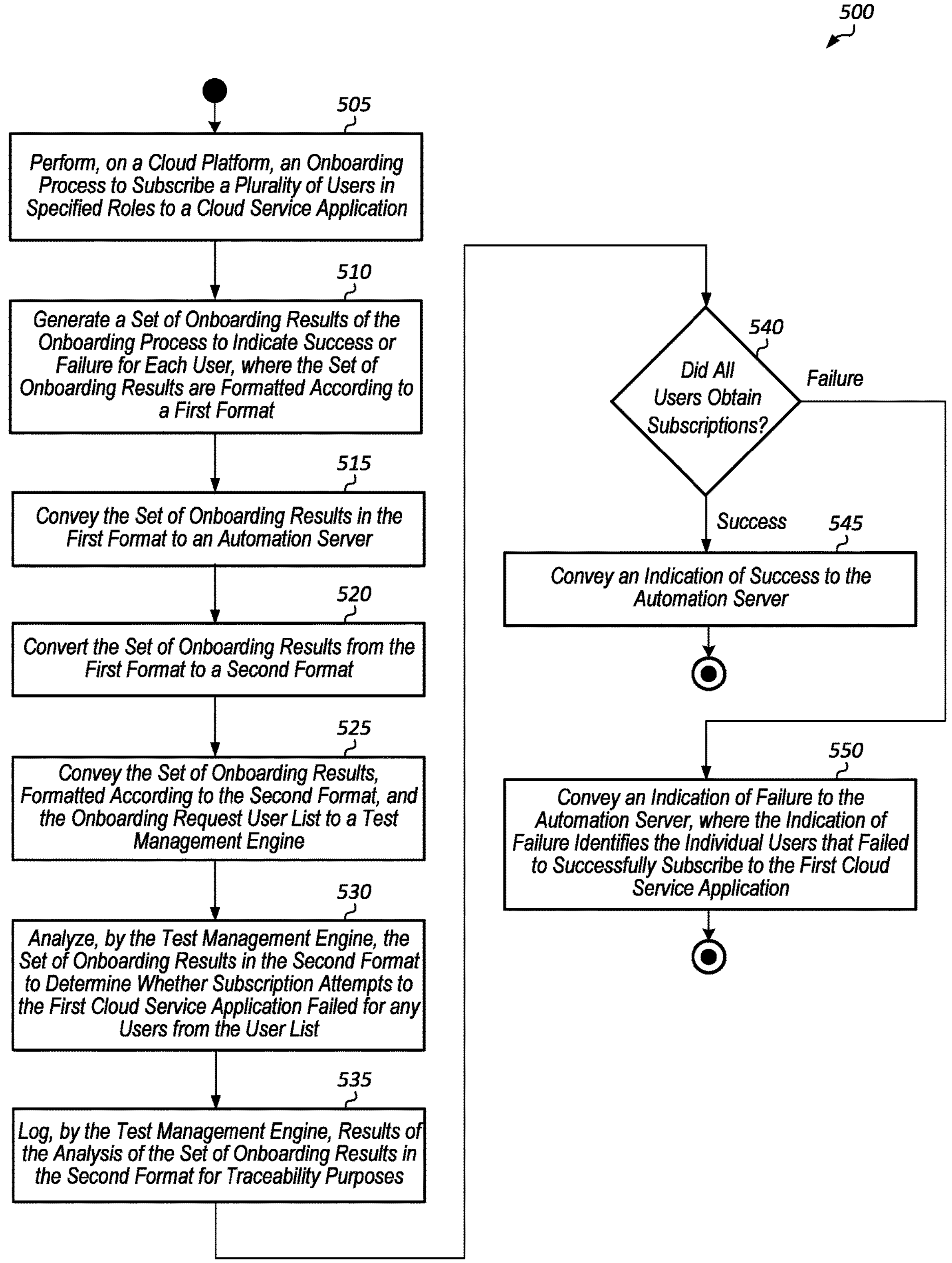
FIG. 5 illustrates an example of a process for translating onboarding results, in accordance with some example implementations of the current subject matter.

Referring now to FIG. 5, a flow diagram illustrating a process for translating onboarding results is shown. An onboarding process is performed on a cloud platform to subscribe a plurality of users in specified roles to a cloud service application (block 505). The cloud platform generates a set of onboarding results of the onboarding process, where the set of onboarding results indicate success or failure of the onboarding process, and where the set of onboarding results are formatted according to a first format (block 510). In some embodiments, the first format includes information specific to and readable by the cloud platform and the cloud service application. Next, the set of onboarding results in the first format are conveyed to an automation server (block 515). Then, the automation server, subsequent to receiving the set of onboarding results in the first format, converts the set of onboarding results to a second format (block 520). In some embodiments, the second format includes information specific to and readable by a test management engine.

Next, the automation server conveys the set of onboarding results, formatted according to the second format, and the onboarding request user list to a test management engine (block 525). Then, the test management engine analyzes the set of onboarding results in the second format to determine whether subscription attempts to the first cloud service application failed for any users from the user list (block 530). Next, the test management engine logs (i.e., stores) results of the analysis of the set of onboarding results in the second format for traceability purposes (block 535). If the analysis indicates that all users specified in the original list were able to successfully subscribe to the first cloud service application during the onboarding process (conditional block 540, "success" leg), then the test management engine conveys an indication of success to the automation server (block 545). After block 545, method 500 may end. If the analysis indicates that any users failed to obtain subscriptions during the onboarding process (conditional block 540, "fail" leg), then the test management engine conveys an indication of failure to the automation server, where the indication of failure identifies the individual users that failed to successfully subscribe to the first cloud service application (block 550). After block 550, method 500 may end. A discussion of the automation server responding to the indication of failure is described below in the discussion regarding method 600 (of FIG. 6).

Figure 6:
FIG. 6 illustrates an example of a process for automatically rerunning an onboarding process with updated script parameters, in accordance with some example implementations of the current subject matter.
Figure 6:
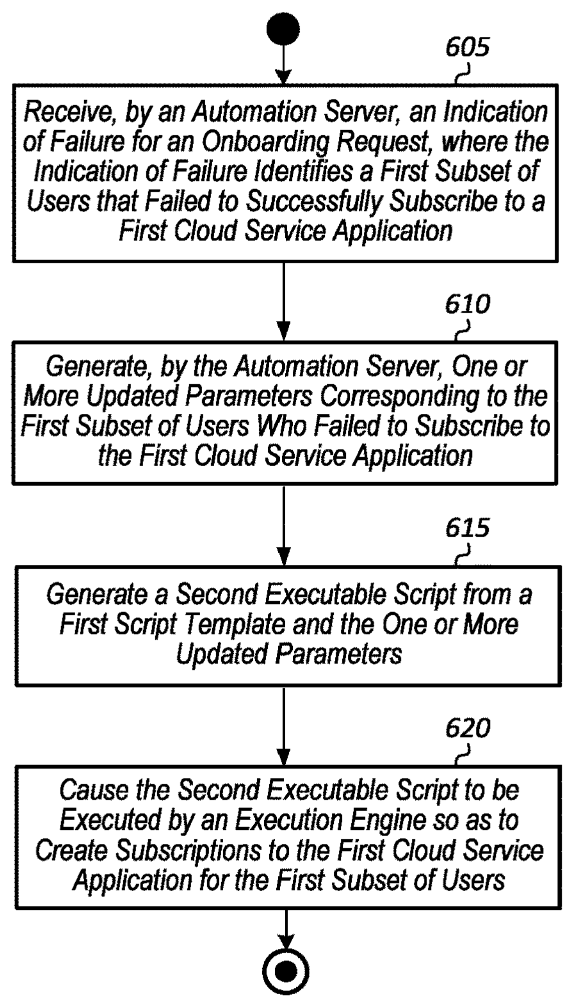

Turning now to FIG. 6, a flow diagram illustrating a process for automatically rerunning an onboarding process with updated script parameters are shown. An automation server receives an indication of failure for an onboarding request, where the indication of failure identifies a first subset of users that failed to successfully subscribe to a first cloud service application (block 605). The first subset of users refers to the portion of users, from the original customer list associated with the original onboarding request, whose subscriptions to the first cloud service application were not successfully created.

In response to receiving the indication of failure, the automation server generates one or more updated parameters corresponding to a first subset of users who failed to subscribe to the first cloud service application (block 610). For example, in cases where a user's role or usage limit correspond to an illegal, non-existent, or unavailable role or limit, the automation server converts the specified role or specified limit to an updated role or limit that is available and/or legal. In some embodiments, the automation server can choose the available role or limit that is closest to the one specified in the original customer list from the onboarding request if the one specified is not available. In one example, if the user's usage limit is specified as 40% in the onboarding request parameters, but there is not a 40% usage limit available for the application, the automation server may convert the 40% limit to a 50% usage limit which is available for the application. Also, if a first role specified for the user in the original onboarding request is not available, the automation server may modify the first role to a second role which is available. It is noted that for any of these modifications which are performed, the automation server may generate a notification to the customer. Also, the notification (e.g., email) that gets sent from the automation server to a user may inform the user of the modified parameters associated with the user's subscription.

Next, the automation server generates a second executable script from a first script template and the one or more updated parameters (block 615). Then, the automation server causes the second executable script to be executed by an execution engine so as to create subscriptions to the first cloud service application for the first subset of users (block 620). After block 620, method 600 ends. It is noted that after block 620 is performed, the previously described steps from method 500 (of FIG. 5) can be performed to determine whether the second onboarding attempt was successful. If the second onboarding attempt was unsuccessful, additional attempts can be made and/or an administrator or other support personnel may be notified for assistance. It is also noted that method 600 can be performed to automatically retry a subscription attempt without customer intervention. In some cases, retrying subscription attempts may be a configurable option that a customer can select in order to enable this feature.

Figure 7A:
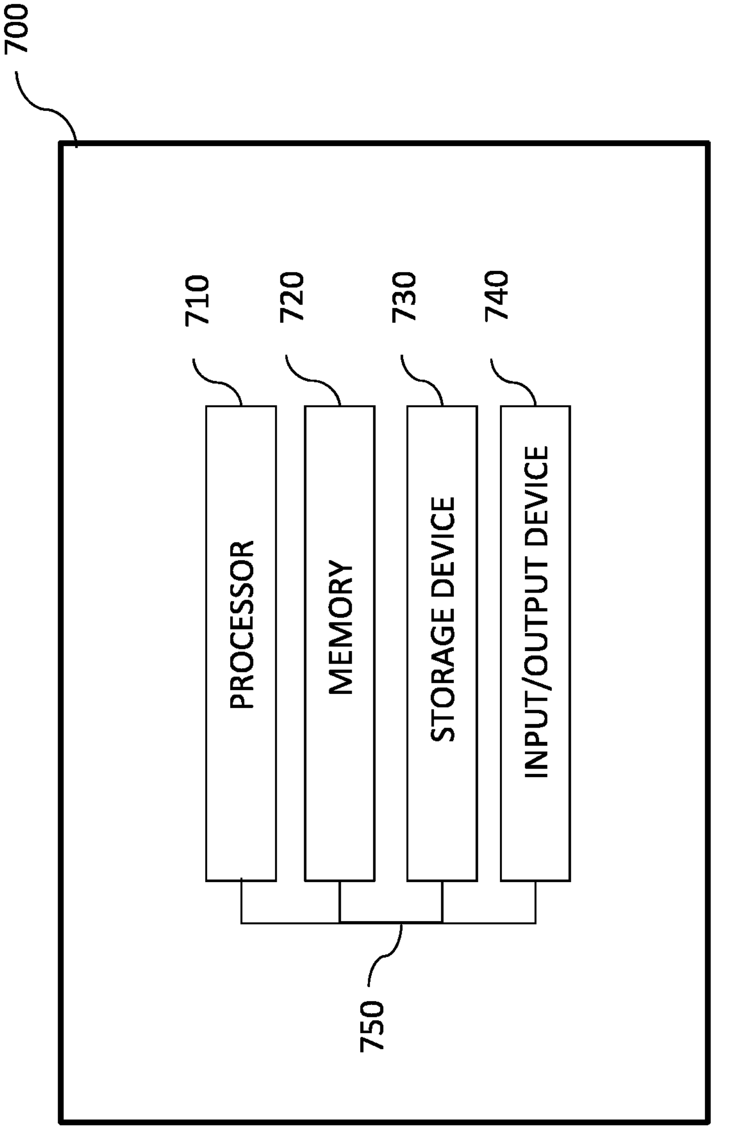
FIG. 7A depicts an example of a system, in accordance with some example implementations of the current subject matter.

In some implementations, the current subject matter may be configured to be implemented in a system 700, as shown in FIG. 7A. The system 700 may include a processor 710, a memory 720, a storage device 730, and an input/output device 740. Each of the components 710, 720, 730 and 740 may be interconnected using a system bus 750. The processor 710 may be configured to process instructions for execution within the system 700. In some implementations, the processor 710 may be a single-threaded processor. In alternate implementations, the processor 710 may be a multi-threaded processor. The processor 710 may be further configured to process instructions stored in the memory 720 or on the storage device 730, including receiving or sending information through the input/output device 740. The memory 720 may store information within the system 700. In some implementations, the memory 720 may be a computer-readable medium. In alternate implementations, the memory 720 may be a volatile memory unit. In yet some implementations, the memory 720 may be a non-volatile memory unit. The storage device 730 may be capable of providing mass storage for the system 700. In some implementations, the storage device 730 may be a computer-readable medium. In alternate implementations, the storage device 730 may be a floppy disk device, a hard disk device, an optical disk device, a tape device, non-volatile solid state memory, or any other type of storage device. The input/output device 740 may be configured to provide input/output operations for the system 700. In some implementations, the input/output device 740 may include a keyboard and/or pointing device. In alternate implementations, the input/output device 740 may include a display unit for displaying graphical user interfaces.

Figure 7B:
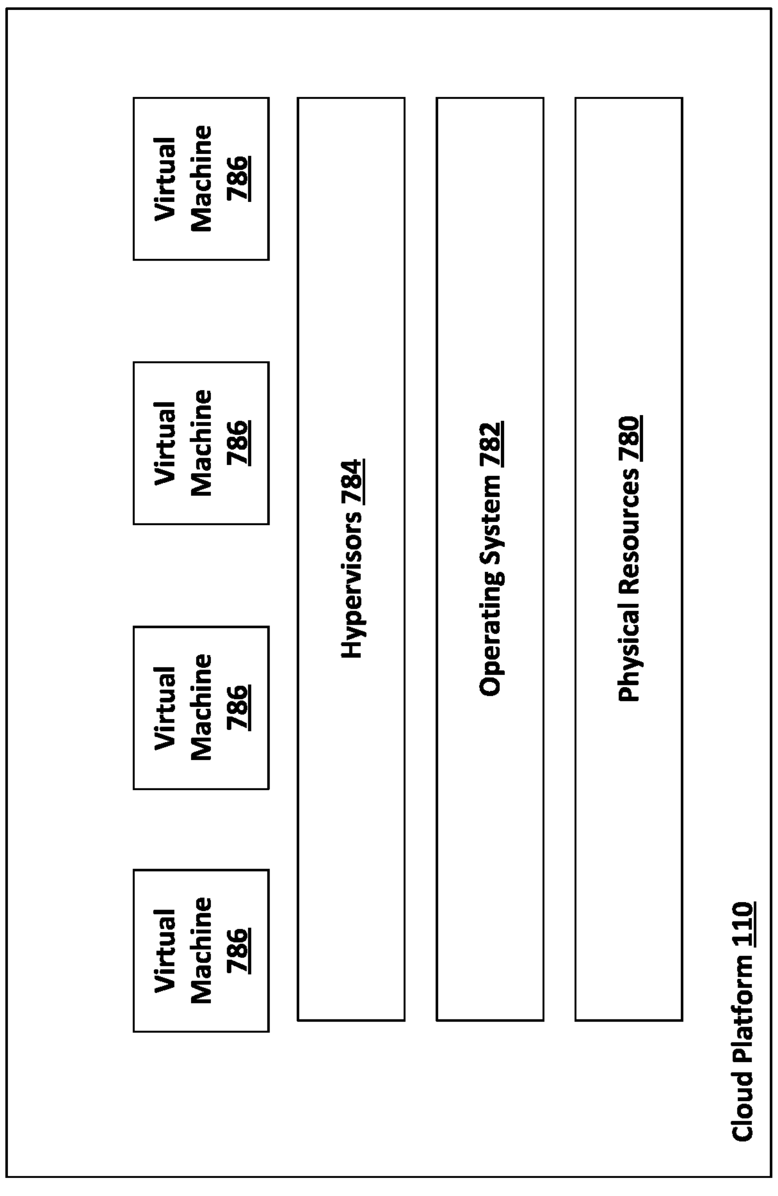
FIG. 7B depicts another example of a system, in accordance with some example implementations of the current subject matter.

FIG. 7B depicts an example implementation of the cloud platform 110, which provided the cloud services. The cloud platform 110 may include physical resources 780, such as at least one hardware servers, at least one storage, at least one memory, at least one network interface, and the like. The cloud server may also include infrastructure, as noted above, which may include at least one operating systems 782 for the physical resources and at least one hypervisor 784 (which may create and run at least one virtual machine 786). For example, each multitenant application may be run on a corresponding virtual machine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method, comprising: receiving by a subscription automator, a first onboarding request from a first client device; extracting, by the subscription automator, a plurality of parameters from the first onboarding request; retrieving, by the subscription automator, a first script template from an automation framework; generating, by the subscription automator, a first executable script by populating the first script template with the plurality of parameters; causing, by the subscription automator, the first executable script to be executed to initiate a first onboarding process of a first cloud service application; and creating, by the subscription automator, one or more subscriptions to the first cloud service application for one or more users as a result of initiating the first onboarding process.

Example 2: The method of example 1, further comprising: generating, by an execution engine, a set of results of the first onboarding process, wherein the set of results are formatted according to a first format; receiving, by an automation server, the set of results in the first format; converting, by the automation server, the set of results to a second format; and conveying, by the automation server, the set of results in the second format to a test management engine.

Example 3: The method of example 2, further comprising analyzing, by the test management engine, the set of results in the second format and the plurality of parameters to determine whether any users, of the plurality of users, failed to obtain subscriptions to the first cloud service application.

Example 4: The method of any of examples 1-3, wherein in response to determining that a first subset of users, of the plurality of users, failed to obtain subscriptions to the first cloud service application, the method further comprising: generating, by the subscription automator, one or more updated parameters based on the test management engine analyzing the set of results in the second format; generating, by the subscription automator, a second executable script from the first script template and the one or more updated parameters; and causing, by the subscription automator, the second executable script to be executed to initiate a second onboarding process of the first cloud service application for the first subset of users; and causing the first subset of users to successfully obtain subscriptions to the first cloud service application as a result of initiating the second onboarding process.

Example 5: The method of any of examples 1-4, wherein in response to determining that the first subset of users failed to obtain subscriptions to the first cloud service application, the method further comprising sending to the first client device, an indication of a modification of the second onboarding process for the first subset of users, wherein the modification corresponds to the one or more updated parameters.

Example 6: The method of any of examples 1-5, wherein the indication specifies that a first role was converted to a second role for at least one user of the first subset of users.

Example 7: The method of any of examples 1-5, wherein the indication specifies that a first usage limit was converted to a second usage limit for at least one user of the first subset of users.

Example 8: The method of any of examples 1-5, wherein the one or more updated parameters are generated based on one or more indications conveyed to the automation server by the test management engine.

Example 9: The method of any of examples 1-8, wherein the plurality of parameters for populating the first script template comprise a list of users, a desired role for each user of the list of users, and a mail identifier (ID) for each user of the list of users.

Example 10: The method of any of examples 1-9, wherein the plurality of parameters for populating the first script template further comprise a usage limit for each user of the list of user.

Example 11: A system, comprising: at least one processor; and at least one memory including program instructions which when executed by the at least one processor causes operations comprising: receiving a first onboarding request from a first client device; extracting a plurality of parameters from the first onboarding request; retrieving a first script template from an automation framework; generating a first executable script by populating the first script template with the plurality of parameters; causing the first executable script to be executed to initiate a first onboarding process of a first cloud service application; and creating one or more subscriptions to the first cloud service application for one or more users as a result of initiating the first onboarding process.

Example 12: The system of example 11, wherein the program instructions are further executable by the at least one processor to cause operations comprising: generating, by an execution engine, a set of results of the first onboarding process, wherein the set of results are formatted according to a first format; receiving, by an automation server, the set of results in the first format; converting, by the automation server, the set of results to a second format; and conveying, by the automation server, the set of results in the second format to a test management engine.

Example 13: The system of any of examples 11-12, wherein the program instructions are further executable by the at least one processor to cause operations comprising analyzing, by the test management engine, the set of results in the second format and the plurality of parameters to determine whether any users, of the plurality of users, failed to obtain subscriptions to the first cloud service application.

Example 14: The system of any of examples 11-13, wherein in response to determining that a first subset of users, of the plurality of users, failed to obtain subscriptions to the first cloud service application, the program instructions are further executable by the at least one processor to cause operations comprising: generating one or more updated parameters based on the test management engine analyzing the set of results in the second format; generating a second executable script from the first script template and the one or more updated parameters; causing the second executable script to be executed to initiate a second onboarding process of the first cloud service application for the first subset of users; and causing the first subset of users to successfully obtain subscriptions to the first cloud service application as a result of initiating the second onboarding process.

Example 15: The system of any of examples 11-14, wherein in response to determining that the first subset of users failed to obtain subscriptions to the first cloud service application, the program instructions are further executable by the at least one processor to cause operations comprising sending to the first client device, an indication of a modification of the second onboarding process for the first subset of users, wherein the modification corresponds to the one or more updated parameters.

Example 16: The system of any of examples 11-15, wherein the indication specifies that a first role was converted to a second role for at least one user of the first subset of users.

Example 17: The system of any of examples 11-15, wherein the indication specifies that a first usage limit was converted to a second usage limit for at least one user of the first subset of users.

Example 18: The system of any of examples 11-15, wherein the one or more updated parameters are generated based on one or more indications conveyed to the automation server by the test management engine.

Example 19: The system of any of examples 11-18, wherein the plurality of parameters for populating the first script template comprise a list of users, a desired role for each user of the list of users, a usage limit for each user of the list of user, and a mail identifier (ID) for each user of the list of users Example 20: A non-transitory computer readable medium storing instructions, which when executed by at least one data processor, result in operations comprising: receiving a first onboarding request from a first client device; extracting a plurality of parameters from the first onboarding request; retrieving a first script template from an automation framework; generating a first executable script by populating the first script template with the plurality of parameters; causing the first executable script to be executed to initiate a first onboarding process of a first cloud service application; and creating one or more subscriptions to the first cloud service application for one or more users as a result of initiating the first onboarding process.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method, comprising:

receiving, by a subscription automator, a first onboarding request from a first client device;

extracting, by the subscription automator, a plurality of parameters from the first onboarding request;

retrieving, by the subscription automator, a first script template from an automation framework;

generating, by the subscription automator, a first executable script by populating the first script template with the plurality of parameters;

causing, by the subscription automator, the first executable script to be executed by an execution engine that is a command line interface to initiate a first onboarding process of a first cloud service application;

creating, by the subscription automator, one or more subscriptions to the first cloud service application for one or more users as a result of initiating the first onboarding process, the one or more subscriptions authorizing the one or more users to access and/or execute the first cloud service application in accordance with a given service agreement;

generating a set of results of the first onboarding process, wherein the set of results are formatted according to a first format;

converting the set of results to a second format comprising information specific to and readable by a test management engine;

conveying the set of results in the second format to the test management engine; and analyzing, by the test management engine, the set of results in the second format to determine whether any users of the one or more users failed to obtain subscriptions to the first cloud service application.

2. The method of claim 1, wherein in response to determining that a first subset of users, of the one or more users, failed to obtain subscriptions to the first cloud service application, the method further comprising:

generating, by the subscription automator, one or more updated parameters based on the test management engine analyzing the set of results in the second format;

generating, by the subscription automator, a second executable script from the first script template and the one or more updated parameters;

causing, by the subscription automator, the second executable script to be executed to initiate a second onboarding process of the first cloud service application for the first subset of users; and causing the first subset of users to successfully obtain subscriptions to the first cloud service application as a result of initiating the second onboarding process.

3. The method of claim 2, wherein in response to determining that the first subset of users failed to obtain subscriptions to the first cloud service application, the method further comprising sending to the first client device, an indication of a modification of the second onboarding process for the first subset of users, wherein the modification corresponds to the one or more updated parameters.

4. The method of claim 3, wherein the indication specifies that a first role was converted to a second role for at least one user of the first subset of users.

5. The method of claim 3, wherein the indication specifies that a first usage limit was converted to a second usage limit for at least one user of the first subset of users.

6. The method of claim 3, wherein the one or more updated parameters are generated based on one or more indications conveyed to the automation server by the test management engine.

7. The method of claim 1, wherein the plurality of parameters for populating the first script template comprise a list of users, a desired role for each user of the list of users, a mail identifier (ID) for each user of the list of users, and a usage limit for each user of the list of users.

8. The method of claim 7, wherein the automation framework comprises a library of script templates for different software applications, the first script template being retrieved from the library of script templates.

9. A system, comprising:

at least one processor; and at least one memory including program instructions which when executed by the at least one processor causes operations comprising:

receiving a first onboarding request from a first client device;

extracting a plurality of parameters from the first onboarding request;

retrieving a first script template from an automation framework;

generating a first executable script by populating the first script template with the plurality of parameters;

causing the first executable script to be executed by an execution engine that is a command line interface to initiate a first onboarding process of a first cloud service application;

creating one or more subscriptions to the first cloud service application for one or more users as a result of initiating the first onboarding process, the one or more subscriptions authorizing the one or more users to access and/or execute the first cloud service application in accordance with a given service agreement;

generating a set of results of the first onboarding process, wherein the set of results are formatted according to a first format;

converting the set of results to a second format comprising information specific to and readable by a test management engine;

conveying the set of results in the second format to the test management engine; and analyzing, by the test management engine, the set of results in the second format to determine whether any users of the one or more users failed to obtain subscriptions to the first cloud service application.

10. The system of claim 9, wherein in response to determining that a first subset of users, of the one or more users, failed to obtain subscriptions to the first cloud service application, the program instructions are further executable by the at least one processor to cause operations comprising:

generating one or more updated parameters based on the test management engine analyzing the set of results in the second format;

generating a second executable script from the first script template and the one or more updated parameters;

causing the second executable script to be executed to initiate a second onboarding process of the first cloud service application for the first subset of users; and causing the first subset of users to successfully obtain subscriptions to the first cloud service application as a result of initiating the second onboarding process.

11. The system of claim 10, wherein in response to determining that the first subset of users failed to obtain subscriptions to the first cloud service application, the program instructions are further executable by the at least one processor to cause operations comprising sending to the first client device, an indication of a modification of the second onboarding process for the first subset of users, wherein the modification corresponds to the one or more updated parameters.

12. The system of claim 11, wherein the indication specifies that a first role was converted to a second role for at least one user of the first subset of users.

13. The system of claim 11, wherein the indication specifies that a first usage limit was converted to a second usage limit for at least one user of the first subset of users.

14. The system of claim 11, wherein the one or more updated parameters are generated based on one or more indications conveyed to the automation server by the test management engine.

15. The system of claim 9, wherein the program instructions are further executable by the at least one processor to cause operations comprising:

in response to the one or more subscriptions being successfully created, sending a notification and login credentials to the one or more users, the notification comprising an indication of a particular role assigned to each user.

16. A non-transitory computer readable medium storing instructions, which when executed by at least one data processor, cause operations comprising:

receiving a first onboarding request from a first client device;

extracting a plurality of parameters from the first onboarding request;

retrieving a first script template from an automation framework;

generating a first executable script by populating the first script template with the plurality of parameters;

causing the first executable script to be executed by an execution engine that is a command line interface to initiate a first onboarding process of a first cloud service application;

creating one or more subscriptions to the first cloud service application for one or more users as a result of initiating the first onboarding process, the one or more subscriptions authorizing the one or more users to access and/or execute the first cloud service application in accordance with a given service agreement;

generating a set of results of the first onboarding process, wherein the set of results are formatted according to a first format;

converting the set of results to a second format comprising information specific to and readable by a test management engine;

conveying the set of results in the second format to the test management engine; and analyzing, by the test management engine, the set of results in the second format to determine whether any users of the one or more users failed to obtain subscriptions to the first cloud service application.

* * * * *